United States Patent [19]

Gregory et al.

[11] 4,023,331

[45] May 17, 1977

[54] AUTOMATIC TOBACCO HARVESTER AND DEFOLIATOR ASSEMBLY THEREFOR

[76] Inventors: C. Albert Gregory; R. Lane Gregory, both of Rte. 2, Angier, N.C. 27501

[22] Filed: July 10, 1975

[21] Appl. No.: 594,638

[52] U.S. Cl. .............................................. 56/27.5
[51] Int. Cl.² ....................................... A01D 45/16
[58] Field of Search ....................... 56/27.5, 46, 47

[56] References Cited

UNITED STATES PATENTS

| 669,046 | 2/1901 | Miles | 56/46 |
|---|---|---|---|
| 2,635,408 | 4/1953 | Cox | 56/27.5 |
| 2,696,069 | 12/1954 | Hawkins | 56/27.5 |
| 2,816,411 | 12/1957 | Wilson | 56/27.5 |
| 2,876,610 | 3/1959 | West et al. | 56/27.5 |
| 3,603,064 | 9/1971 | Pinkham | 56/27.5 |
| 3,695,014 | 10/1972 | Alphin | 56/27.5 |
| 3,902,304 | 9/1975 | Mitchell | 56/27.5 |

Primary Examiner—Russell R. Kinsey
Attorney, Agent, or Firm—Mills & Coats

[57] ABSTRACT

The present invention relates to an automatic tobacco harvester and to a defoliator assembly therefor, the tobacco harvester being of the type that is readily adaptable to connect directly to a conventional three point hitch of a farm tractor. The automatic tobacco harvester and defoliator assembly therefor is of the "multi-pass" type in that the defoliator assembly of the harvester can be used to prime or defoliate only a certain level of leaves from the stalks during tobacco harvesting operation while leaving unripened leaves on the stalks. As the lower priming are removed from the stalks, the defoliator assembly is accordingly moved upwardly to accommodate other priming levels during the course of the tobacco harvesting season. The defoliation of the tobacco leaves is accomplished by a pair of defoliator units or assemblies carried by a frame structure in lateral spaced apart relationship in order that a tobacco stalk row may pass therebetween. Each defoliator unit or assembly carries a series of defoliator fingers that move into the plane of the stalk row and adjacent respective stalks during what is referred to as the defoliating cycle, and the same fingers are retracted from the plane of the stalk row during at least a portion of the non-defoliating cycle in order that the fingers may return to the beginning point of the defoliating cycle without interfering with the tobacco stalks passing therebetween.

9 Claims, 9 Drawing Figures

AUTOMATIC TOBACCO HARVESTER AND DEFOLIATOR ASSEMBLY THEREFOR

The present invention relates to agricultural harvesting machinery, and more particularly to an automatic tobacco harvester and a defoliator assembly therefor.

BACKGROUND OF THE INVENTION

Automatic tobacco harvesters are now being widely used in harvesting flue cured tobacco. To-date, the self-propelled, high clearance type of automatic tobacco harvesters such as shown in U.S. Pat. Nos. 3,841,071 and 3,507,103 have met with much commercial success as they are presently being widely used by tobacco farmers. Such self-propelled, high clearance type automatic tobacco harvesters are generally relatively expensive, and consequently many small tobacco farmers have not been able to justify purchasing such an expensive and high capacity tobacco harvester in view of the cost thereof.

Long Manufacturing Company has just recently introduced a tractor mounted tobacco harvester substantially like the tobacco harvester shown in U.S. Pat. No. 3,834,137. Being tractor mounted, the tobacco harvester is adapted to readily attach to a conventional farm tractor and in most cases the farm tractor used would be a tractor that the farmer already has on hand. It appears that tobacco farmers, especially small tobacco farmers, are looking favorably on such a tobacco harvester because of the "tractor mounted" feature that makes the harvester relatively inexpensive when compared wit the self-propelled, high clearance models available. With the Long tractor mounted harvester, however, significant departure is made in the harvesting or priming practice. Traditionally, flue cured tobacco crops are primed a number of times during the harvesting season, the number of primings ranging generally between three and five with the tobacco stalks being initially primed at the bottom and each subsequent priming progressing upwardly therefrom. Each priming in the traditional multipriming practice consists of tobacco leaves taken from the same general area of the tobacco stalks and the type and quality of the leaf is generally the same throughout.

With the Long tractor mounted automatic tobacco harvester just referred to above, the mechanical design thereof does not give the harvester the ability to make multi-passes and to prime certain levels of the tobacco stalks while leaving other levels unprimed. To the contrary, the Long tractor mounted automatic tobacco harvester is essentially a "once over" tobacco harvester in that the basic feature of the design dictates that during the harvesting operation all leaves on the stalks are removed by one pass of the harvester. Accordingly, the leaves at the top and bottom of the stalks are mixed together and are not generally segregated as is the case in the traditional harvesting practice.

SUMMARY OF THE INVENTION

The present invention entails a tractor mountable automatic tobacco harvester that has the capability of priming only certain levels of the tobacco stalks in accordance with traditional and conventional cultural flue cured harvesting practices. In particular, the automatic tobacco harvester of the present invention is specifically designed to attach quickly and readily to a conventional three point hitch attachment found on farm tractors today. The frame structure of the tobacco harvester extends transversely and outwardly to one side of the tractor where two defoliator assemblies or units are supported in lateral spaced apart relationship so as to define a tobacco stalk row opening therebetween for receiving respective tobacco stalks of the row being harvested during the harvesting operation. Each defoliator unit or assembly includes a plurality of defoliating fingers circumferentially spaced on an endless finger carrier assembly that is continuously driven during the tobacco harvesting operation. Each respective defoliating finger is movable between a defoliating position and a non-defoliating position. In said defoliating position, the respective defoliating fingers project into the plane of the tobacco stalk row and the defoliating fingers so projecting move rearwardly and downwardly with the stalk as it passes between the defoliating units so as to engage the leaves about the top sides thereof and to break them or defoliate them from the stalk as the defoliating finger moves rearwardly therewith. After the respective defoliating fingers have completed the defoliating cycle, they are at an appropriate point in the movement cycle retracted to a non-defoliating position where the defoliating fingers may return from a rear point of the cycle to a front point or the beginning of the defoliating cycle without interfering with the stalks passing through and between the defoliating units.

As a portion of the stalk is defoliated, the leaves are received by a conveying assembly means and conveyed from the area of the defoliating assemblies to a collection area in which in the present case comprises a trailer or rack structure that is being towed by the tractor during the harvesting operation.

It is, therefore, an object of the present invention to provide a relatively inexpensive tractor mounted tobacco harvester that is adapted to perform multi-primings on a crop of tobacco.

A further object of the present invention resides in the provision of a tobacco harvester that is adapted to readily connect and be disconnected to and form a farm tractor.

Still a further object of the present invention is to provide a tobacco harvester that can be quickly and conveniently connected and disconnected to and from a conventional three point hitch attachment conventionally found on farm tractors.

A further object of the present invention is to providea tobacco harvester having a frame structure that is designed to be connected and supported by a tractor and wherein the frame structure and manner of connection to the tractor is so designed that the frame structure may move independently of the tractor in order that the tobacco harvester can move over terraces and undulations in the ground independently of the tractor during the harvesting operation.

Another object of the present invention is to provide a tobacco harvester adapted to be connected to and supported by a conventional farm tractor in which the tobacco harvester is of a compact design but yet efficient in the tobacco harvesting operation.

A further object of the present invention resides in the provision of a defoliator assembly for an automatic tobacco harvester in which the defoliator assembly is provided with defoliating fingers that are disposed on each side of the stalk row of the tobacco harvesting operation and which are operative to move into the plane of the row to a leaf defoliating position and to a non-defoliating position during the tobacco harvesting operation, the non-defoliating position being assumed in order that the fingers may return to a point to begin defoliation without interfering with the passing stalks between the two defoliator assemblies.

A more specific object of the present invention is to provide a defoliator assembly for an automatic tobacco harvester wherein the defoliator assembly comprises a pair of laterally spaced defoliator assemblies supported in lateral spaced apart relationship by a main frame so as to define a row opening therebetween, and wherein each defoliator assembly or unit comprises an endless flexible defoliator finger carrier assembly that is generally triangularly disposed and continuously driven such that a plurality of defoliator fingers movably secured thereon move between said defoliating and non-defoliating positions in response to the travel of the defoliator carrier assembly means.

Another object of the present invention is to provide a tractor mounted tobacco harvester of a relatively simple and compact design but very efficient in performing the tobacco harvesting operation.

A further object of the present invention is to provide a tobacco harvester of the tractor mounted type having a main frame that is not only easily connected and disconnected to the tractor but also one that is generally simple in design, easy to maintain or repair and which is adapted to support a pair of defoliator assemblies therefrom such that the defoliator assemblies are driven by ground engaging wheels associated therewith and in which the defoliating assembly can move with the contour of the land independently during the harvesting operation.

Other objects and advantages of the present invention will become apparent from a study of the following description and the accompanying drawings which are merely illustrative of the present invention.

DESCRIPTION OF THE PREFERRED EMBODIMENTS

Figure 1:
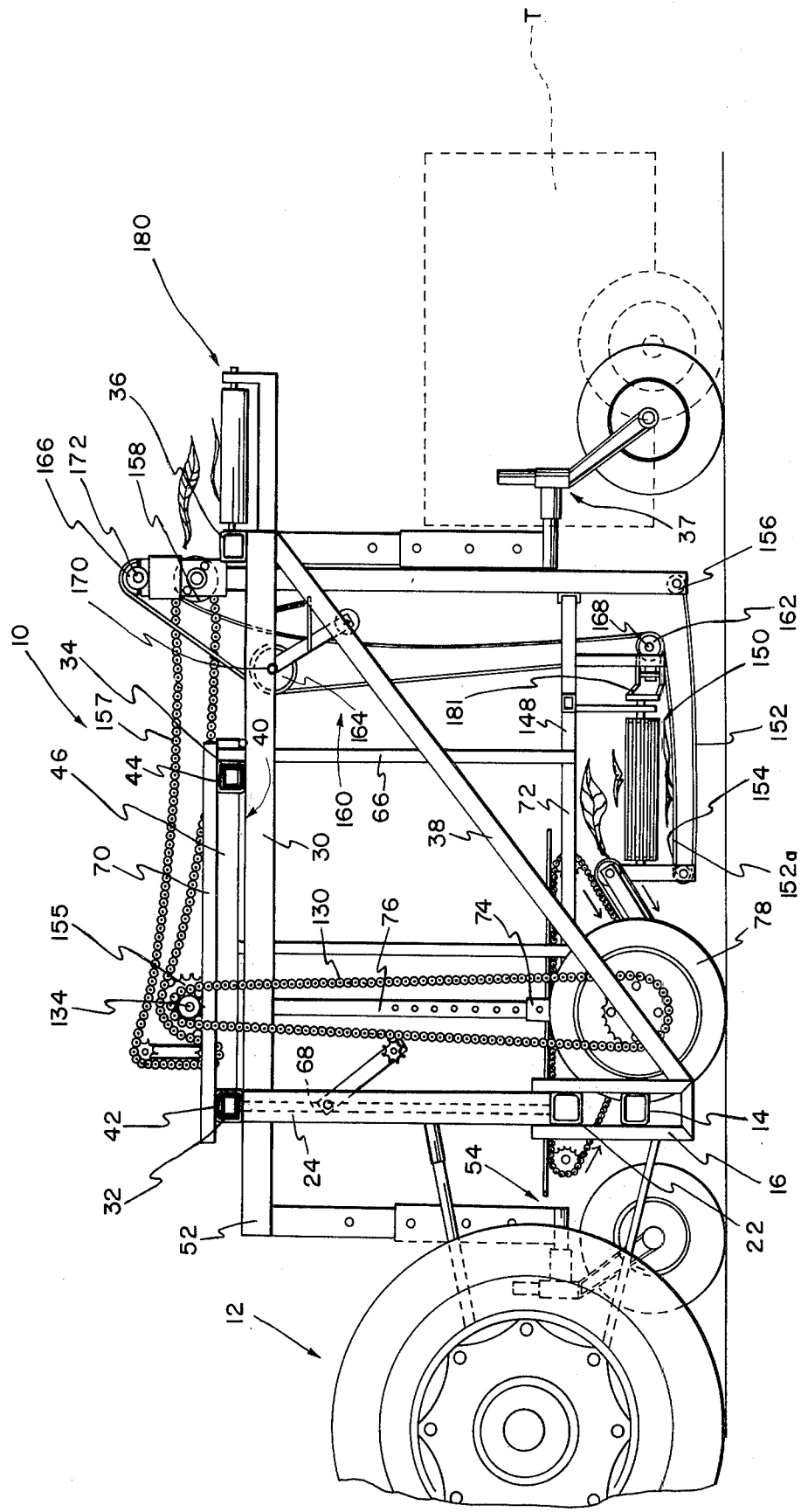
FIG. 1 is a side elevational view of the tractor mounted automatic tobacco harvester of the present invention, showing the tobacco harvester being coupled to a tractor and pulled thereby.

With further reference to the drawings, the tractor mounted tobacco harvester is shown therein and indicated generally by the numeral 10. Before beginning a detailed discussion of the structural components of the tractor mounted tobacco harvester 10, it should be pointed out that the tobacco harvester of the present invention basically comprises a frame structure that is adapted to connect to a conventional three point hitch of a farm tractor 12 as illustrated in FIG. 1, and to extend therefrom so as to suport a pair of defoliator assemblies indicated generally by the numeral 80 (FIG. 3) in lateral spaced apart relationship so as to define a tobacco stalk row opening therebetween for receiving a tobacco stalk row during the tobacco harvesting operation.

Figure 6:
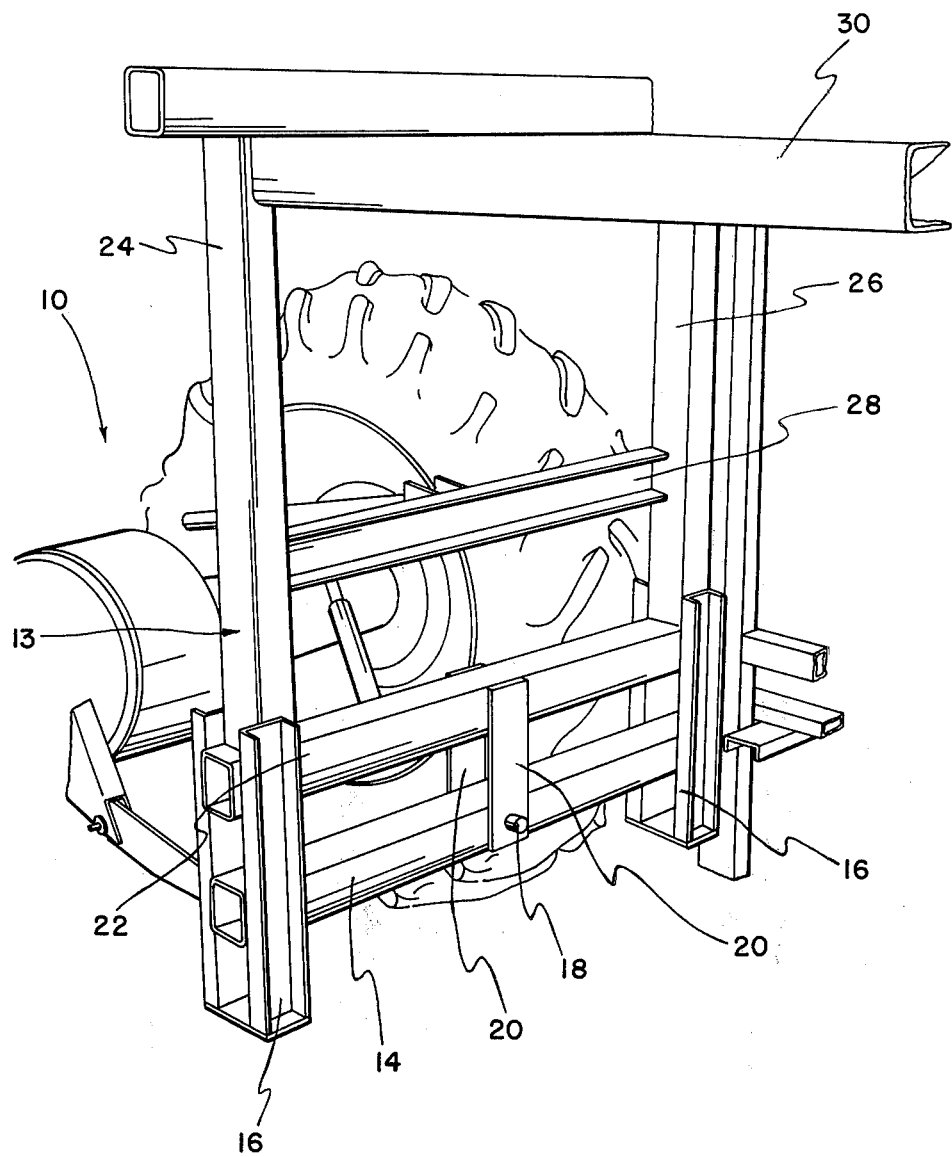
FIG. 6 is a fragmentary perspective view of a portion of the main frame of the tractor mounted tobacco harvester and particularly illustrates how the main frame attaches to a conventional three point tractor hitch assembly.
Figure 7:
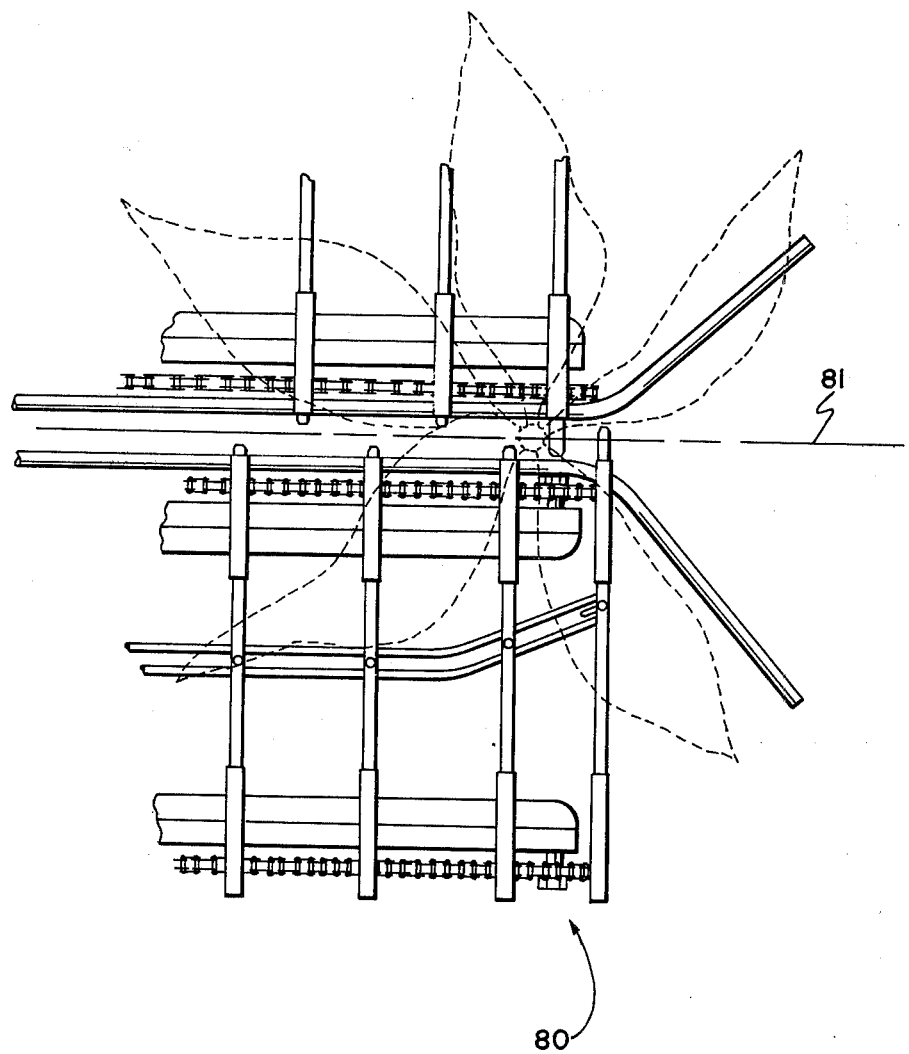
FIG. 7 is a fragmentary top plan view of a portion of the two defoliator units or assemblies of the tractor mounted tobacco harvester and shows the relationship between the two units as a tobacco stalk enters the front stalk receiving area therebetween.

First, with respect to the frame structure of the tobacco harvester 10, it is seen that the same comprises a lower beam 14 that is fixed to the outer lower points of the tractor's three point hitch assembly and extends transversely therebetween. Disposed on each end of the lower beam member 14 is an U-shaped rectangular guide frame 16 that is adapted to receive the lower portions of a swing frame 13 (FIG. 6) that is supported by the lower beam member 14 by a pair of longitudinally spaced plates 20 that are fixed to a pivot pin 18 extending through the lower beam 14 and extend upwardly therefrom where the plates 20 are attached to a carrier transverse beam 22 of the swing frame 13. Swing frame 13 further includes a pair of vertical members 24 and 26 that are interconnected by an intermediate cross member 28 that serves to mount the upper center hitch link of the tractor's three point hitch assembly.

Fixed to the upper portions of the vertical members 24 and 26 are a pair of laterally spaced generally horizontally extending members 30 that are supported by a pair of diagonal braces 38 that extend from the rear portions thereof downwardly towards the front where the front ends of the diagonal braces are connected to appropriate points of the frame structure about the three point hitch attachment area.

Extending transversely from the two horizontal members 30 are a series of three longitudinally spaced beams 32, 34 and 36. As will be more fully understood from subsequent portions of the present disclosure, the forwardmost two beams, 32 and 34, act to support the defoliator header frame structure, while the rearmost transverse beam 36 acts to support a final transverse cross conveyor 180. Transverse beam 36 also includes a right rear casterwheel assembly 37 located at the extreme right side thereof, the casterwheel acting to support the tobacco harvester frame structure about the rear thereof.

Slidably mounted about transverse beams 32 and 34 is an intermediate defoliator head frame that is indicated generally by the numeral 40. Defoliator head frame 40 includes a pair of transverse slide channels 42 and 44 correspondingly spaced the same as transverse beams 32 and 34 and slidably mounted therein and adjustable laterally therealong. About the extreme ends of the slide channels 42 and 44, there is interconnected a pair of left and right-hand cross connecting assemblies 46, each of the cross connecting assemblies including first and second members fixed to and extending between the slide channels 42 and 44 in spaced apart relationship so as to define an open area therebetween. In addition, extending between the cross assemblies 46 and interconnecting the slide channels 42 and 44 is a main central cross member 50. About the right side of said defoliator head frame 40, (the right side being the side opposite that shown in FIG. 1) there is provided a longitudinal right-side support beam assembly 52 that is fixed to the right side of the head frame 40 and extends generally forwardly therefrom where the front portion thereof is fixed to a right front casterwheel assembly indicated generally by the numeral 54. Right front casterwheel assembly 54 during the harvesting of an adjacent inside row is generally aligned with the wheel of the rear casterwheel 37 that depends downwardly from the third transverse beam 36.

Figure 2:
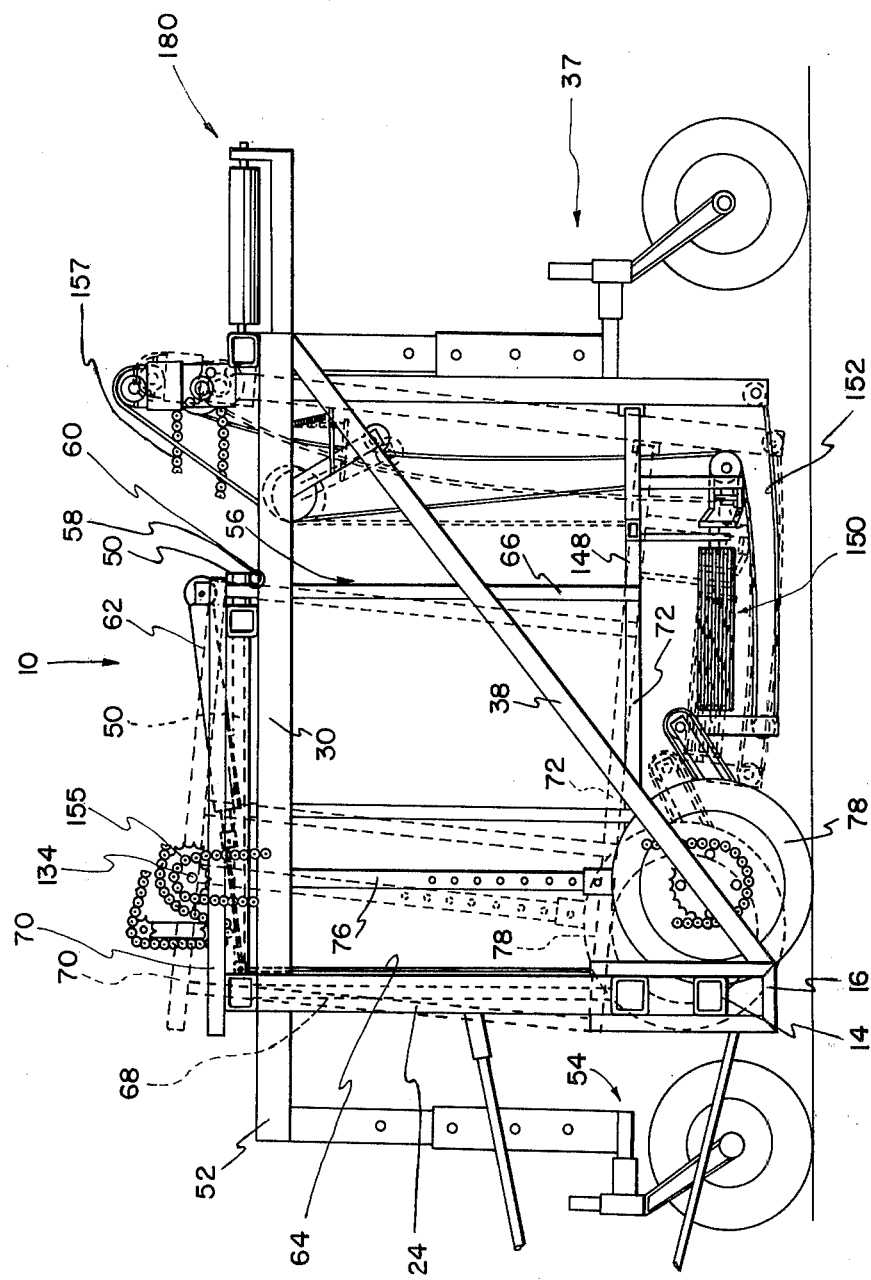
FIG. 2 is another side elevational view of the tractor mounted tobacco harvester of the present invention, particularly illustrating the pivoting of the two laterally spaced apart subframe assemblies that support the two laterally spaced defoliator heads of the tobacco harvester.

Continuing to refer to FIG. 2 and the frame structure of the tobacco harvester 20, there is provided a pair of header subframe assemblies, indicated generally by the numeral 56 in FIG. 2, secured to said intermediate defoliator slide frame 40 and depending downwardly therefrom, each sub-frame assemblies being independent of the other corresponding sub-frame assembly. Because both sub-frame assemblies 56 are substantially identical, only one will be described in detail with the understanding that the other such sub-frame assembly is of a like structure. For supporting the subframe assemblies, there is provided a rear transverse shaft 58 that is rotatively journaled within a transverse sleeve 60 fixed to the rear portion of the central cross member 50 of the defoliator slide frame 40, each sub-frame 56 being fixed about an upper rear portion to said shaft 58 and rotatable therewith.

To support each sub-frame assembly 56 about the front portion thereof, there is provided a cable assembly 64 which is connected about a lower front portion thereof and extends generally upwardly therefrom around properly spaced guide pulleys to where a rear portion thereof connects to the rod end of a hydraulic cylinder 62 mounted on the top portion of the central cross member 50. Hydraulic cylinder 62 is operatively connected to the tractor's hydraulic system and is accordingly actuated thereby by the operator while on the tractor.

Now viewing each header sub-frame 56 in detail, it is seen that the same basically comprises a pair of longitudinally spaced vertical member 66 and 68, integrated connected about the upper and lower portions by upper and lower horizontal members 70 and 72. Therefore, it is seen that the vertical members 66 and 68 along with the horizontal members 70 and 72 form a generally open rectangular frame structure. Also, it should be pointed out that the rearmost disposed vertical member 66 is fixed to the transverse shaft 58 by weldment or other suitable means and consequently this serves to support each of the header sub-frame assemblies 56.

Fixed to the lower horizontal member 72 of each sub-frame assembly 56 is a wheel sleeve 74 which is adapted to receive an adjustable wheel arm 76 therethrough, the wheel arm 76 having a ground engaging drive wheel 78 rotatively mounted about the lower end thereof below the wheel sleeve (FIG. 1). Wheel arm 76 includes a series of vertically spaced openings formed therein that allow the same to be adjustably positioned within the wheel sleeve 74 and consequently it follows that each header sub-frame 56 may be lowered or raised relative to the ground engaging wheel 78. For purposes of turning and transport, the defoliator head subassemblies 56 may be tilted, as shown in slotted lines in FIG. 2, by the actuation of the hydraulic cylinder 62. When so tilted, the wheels 78 do not engage the ground.

Figure 3:
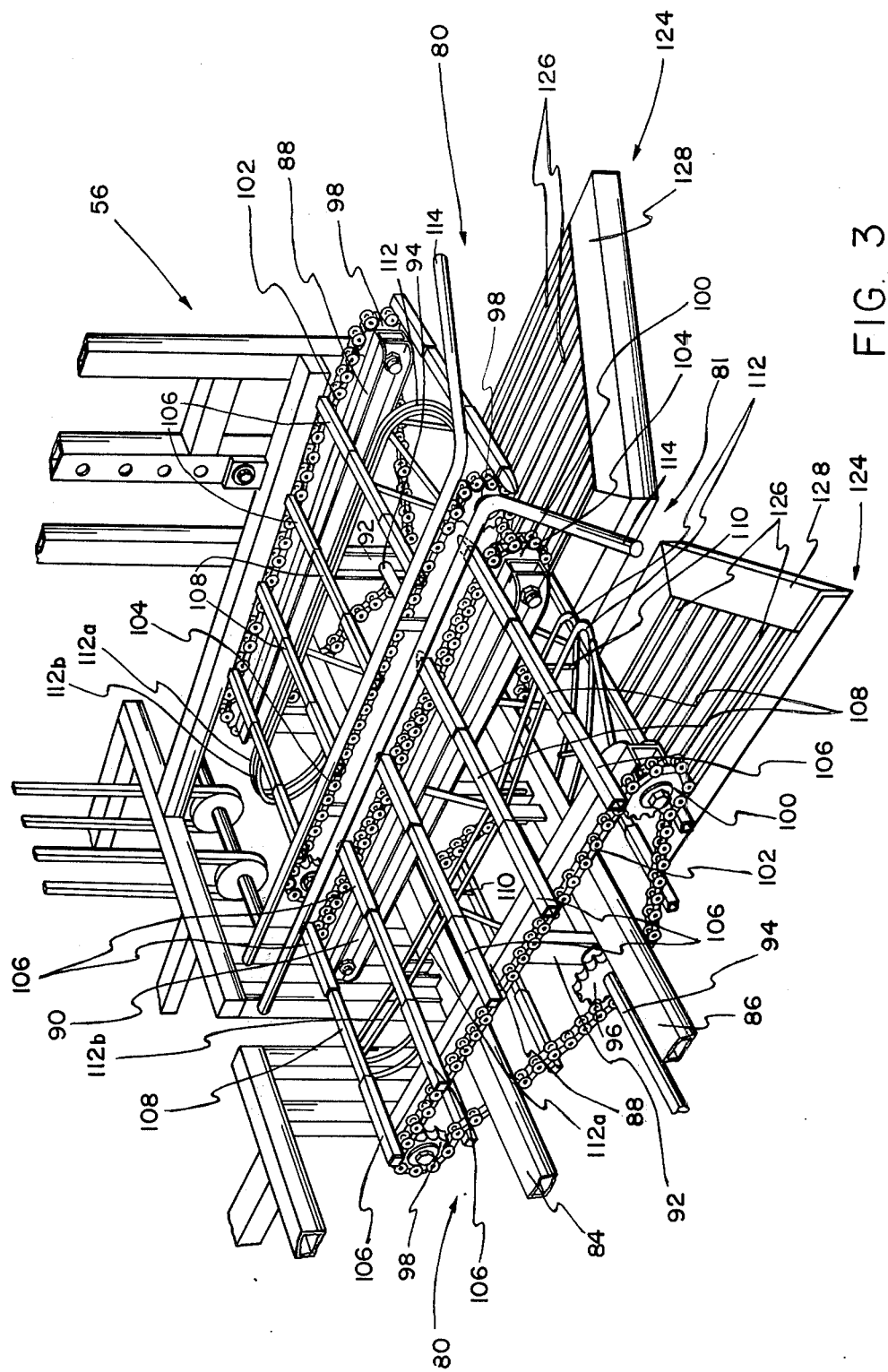
FIG. 3 is a fragmentary perspective view of the defoliator head assembly of the tractor mounted tobacco harvester of the present invention, the defoliator head assembly comprising two laterally spaced defoliator units or assemblies that cooperate with each other in defoliating the tobacco leaves from the stalks passing therebetween during the harvesting operation.

Each of the two header sub-frame assemblies includes a defoliating unit or assembly, indicated generally by the numeral 80 and best shown in FIG. 3, fixed thereto and extending inwardly therefrom in lateral spaced apart relationship so as to define a tobacco stalk row opening 81 therebetween. The pair of defoliating units or assembiies 80 cooperate with each other to defoliate a certain level of leaves from the stalks of the tobacco row passing therebetween. Before proceeding with a detailed discussion of the structure of the respective defoliating units or assemblies 80, it should be pointed out that disposed below each of the defoliating units or assemblies is a longitudinal conveyor assembly, indicated generally by the numeral 82, that is adapted to receive the defoliated leaves and to transfer them rearwardly from the respective defoliating units.

Because the two defoliating units indicated generally by the numeral 80 are of the same general construction, the following description will only involve a description of one unit, but with the understanding that each of the defoliating units comprise essentially the same structural components and operate in the same basic manner. In view of this, each defoliating unit or assembly 80, as best viewed in FIG. 3, comprises a pair of cross support members 84 and 86 fixed to a respective header sub-frame assembly 56 and extending inwardly toward the tobacco row opening 81. Support members 84 and 86 in turn support two laterally spaced rails 88 and 90. Depending downwardly from each of the rails 88 and 90 is a support 92 that includes a jack shaft 94 rotatively therein and having two spaced apart sprockets 96 (only one of which is shown in FIG. 3) fixed to the respective ends thereof. Rotatively journaled at opposite front and rear end portions of each rail 88 and 90 is a front pair of idler sprockets 98 and a rear pair of idler sprockets 100. Therefore, as viewed in FIG. 3, there are two sets of three generally triangularly disposed but longitudinally aligned sprockets with each sprocket set being disposed in lateral spaced apart planes. As viewed in FIG. 3, the outer triangular sprocket set has a chain 102 trained around the three sprockets of the set, while the inner sprocket set has chain 104 trained therearound. Fixed to each of the chains 102 and 104 in circumferential spaced apart relationship is a series of defoliator finger sleeves 106, and wherein each chain is so adjusted with respect to the other such that the defoliator finger sleeves of corresponding chains of each defoliating unit are in traverse alignment so as to receive respective defoliating fingers 108. The defoliator finger sleeves 106 and the defoliator fingers 108 are of a generally elongated square shape and include a guide arm follower 110 that extend from an intermediate point on the defoliator fingers 108 and extends into a cam track opening that is defined by a cam track 112 comprised of a pair of laterally spaced cam track rods 112a and 112b, the cam track being so configurated that the defoliator fingers are moved between defoliating and non-defoliating positions as the corresponding chains 102 and 104 are driven.

Finally, each defoliating unit 80 includes a row opening guide 114 that is designed to channel the stalks of the row being harvested into the row opening area 81 between the two defoliated units or assemblies 80.

Briefly reviewing the defoliator unit or assembly just described, it can be stated that the two chains 102 and 104 and the sleeves 106 associated therewith comprise an endless defoliator finger carrier assembly means and includes a rear to front generally horizontally longitudinal run that generally extends from the vicinity of the rear upper sprockets 100. From sprockets 100 forwardly and downwardly to the main drive sprocket 96 may be referred to as the front inclined or the defoliating run of the defoliator finger carrier assembly means. The stretch of chain from the main drive sprockets 96 back to the rear upper sprockets 98 is referred to as the return run of the finger carrier assembly. The cam track 112 is so configured that respective defoliating fingers 108 are urged inwardly into the plane of the stalk row in the general vicinity of the front sprockets 100 and just prior to their downward desent and remain in that position while traveling along the front or defoliating run of the finger carrier assembly. It is appreciated that during the defoliating run of the finger carrier assembly means that the respective defoliator fingers 108 moving therealong extend into the plane of the stalk row and adjacent a respective stalk and defoliate the leaves disposed thereunder extending from the stalk as the defoliator finger moves rearwardly and downwardly about the front or defoliating run. It is important to appreciate that the respective defoliator fingers 108 of each defoliating unit 80 would be staggered such that successive defoliator fingers 108 of the defoliating units 80 during the time of travel downwardly and rearwardly along the front or defoliating row would be longitudinally spaced apart just greater than the thickness of the tobacco stalk in order that the successive fingers would tend to extend across front and rear sides of each stalk and move generally down the stalk parallel with the axis thereof so as to defoliate the leaves disposed thereunder from the stalks during tobacco harvesting. It will be understood that the respective chains 102 and 104 of each defoliator unit or assembly 80 would be driven at a speed such that the rearward horizontal speed component of each finger during travel along the front or defoliating run would generally be equal and opposite the forward ground speed of the harvester 10 such that the fingers would move in unison with the stalks and would not break or interfere with them.

After the defoliator fingers have moved down the front or defoliating run they may be retracted from the plane of the stalk row to a non-defoliating position. The cam track 112 is so configurated such that the defoliator fingers are retracted to the non-defoliating position at least before they begin their rear-to-front travel along the generally longitudinal and horizontal run.

Figure 5:
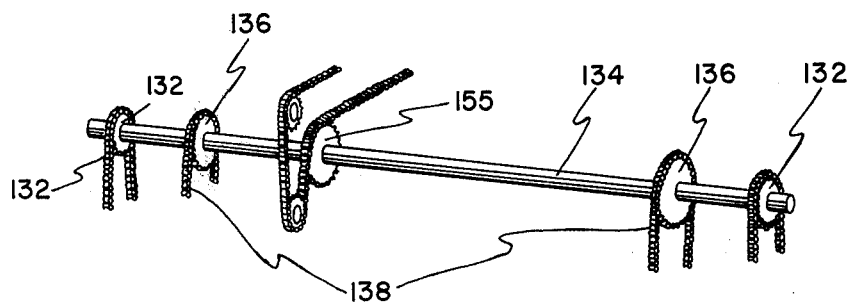
FIG. 5 is a schematic view illustrating the basic drive system for a single defoliator unit and associated longitudinal conveyor assembly disposed thereunder.
Figure 5:
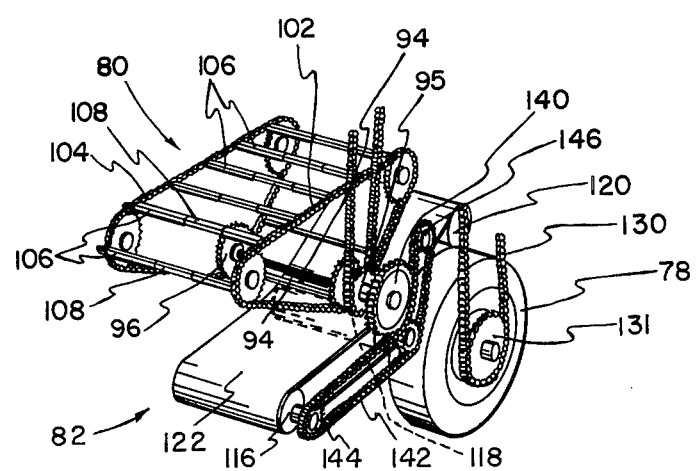

As has already been noted, disposed beneath each defoliator unit or assembly 80 is a longitudinal conveyor assembly 82 as illustrated in FIG. 5. Viewing this conveyor assembly 82 in detail, it is seen that the same comprises a conveyor belt 122 that is trained and disposed around three spaced rollers 116, 118 and 120. Consequently, the defoliated tobacco leaves fall on the upper run of the conveyor belt 122 between the conveyor belt and the lower disposed defoliator fingers 108 and are conveyed rearwardly therefrom.

Extending from the frame of the conveyor assembly is a lower row guide frame structure indicated generally by the numeral 124 and including a series of generally longitudinally extending rods 126 supported by a border frame 128.

The defoliator assembly 80 and the conveyor assembly 82 are driven by the ground engaging wheels 78 that during the tobacco harvesting operation, support in part at least each of the defoliator assemblies 80. Viewing this drive system in more detail, it is seen that the outer wheel 78 includes a drive sprocket 131 rotatable therewith and there is provided a main drive chain 130 that is trained around sprocket 131 and leads upwardly therefrom where a top portion thereof is trained therearound sprocket 132 that is in turn fixed to a transverse jack shaft 134 which drives two driven sprockets 136, each driven sprocket 136 having a driven chain 138 trained therearound and leading downwardly to a respective drive sprocket 95 on shaft 94 of each defoliator assembly 80. Consequently, then it is seen that as the ground engaging wheel 78 move along the ground that the chains 102 and 104 of each defoliator assembly 80 is accordingly driven and thereby causes the defoliator fingers to move between the defoliating and non-defoliating positions.

In driving each of the conveyor assemblies 82, there is provided an outer drive sprocket 140 on each respective drive shaft 94, and a conveyor drive chain 142 back wrapped around sprocket 140 and further trained around drive sprocket 144 that is rotatively mounted with roller 116 and still further trained therearound another sprocket 146 that is rotatively supported by an adjacent respective header sub-frame 56. Therefore, it is appreciated that as each defoliator assembly 80 is driven, the corresponding associated conveyor assembly 82 disposed therebeneath is likewise driven.

Figure 4:
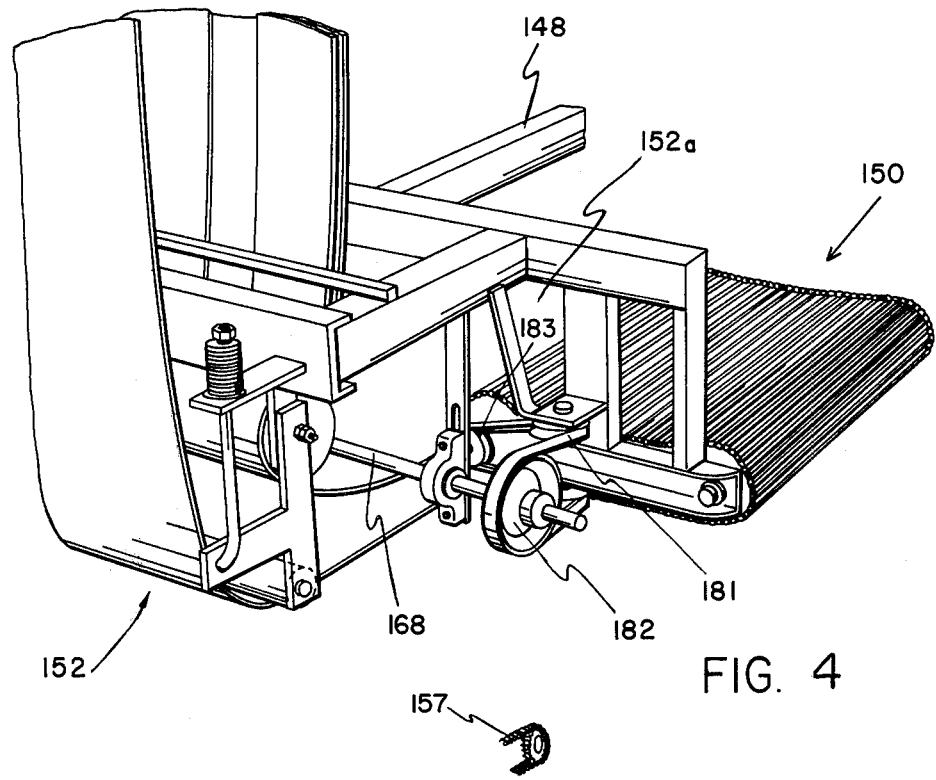
FIG. 4 is a fragmentary perspective view showing a relatively short lateral conveyor and a portion of a vertical elevator assembly, both the lateral conveyor and the vertical elevator assembly being disposed behind each of the respective defoliating units carried by the two pivoting sub-frames depending from the main frame of the tractor mounted tobacco harvester.

Disposed behind each conveyor assembly 82 is a vertical conveyor assembly that is adapted to receive the defoliated tobacco leaves from the conveyor assembly 82 and to convey them generally upwardly therefrom onto a transverse cross conveyor where the tobacco leaves are conveyed laterally into a trailer T (shown in dotted lines in FIG. 1) that is being towed by the tractor. Viewing each vertical conveyor assembly, it is seen that each is supported by a rear frame extension 148 that extends rearwardly from a respective header sub-frame 56. Supported within the rear frame extension 148 is a relatively short lateral conveyor assembly 150 that is disposed generally below the rearward end of the respective adjacent conveyor assembly 82 and adapted to receive the defoliated leaves therefrom and to convey them outwardly where the leaves fall on a main receiving conveyor belt 152 having an upper receiving run area 152a as best illustrated in FIGS. 1 and 4. Main vertical conveyor belt 152 is trained around a series of three rollers 154, 156 and 158. Roller 158 is driven by a chain drive 157 that is operatively connected to sprocket 155 on jack shaft 134.

Disposed forwardly of the main conveyor belt 152 is a pair of laterally spaced cooperating v-belts indicated generally by the numeral 160 that cooperate with the main vertical conveyor belt 152 to convey the tobacco leaves received therebetween to the transversely extending upper cross conveyor 180. Because of the presence of two cooperating belts 160, there is provided a series of pulley sets to train the belts therearound, the three pulley sets being indicated by the numerals 162, 164, and 166, with each pulley set including a pair of like pulleys transversely aligned on corresponding respective shafts 168, 170 and 172. It should be pointed out that the intermediate pulley set 164 is spring biased forwardly, as viewed in FIG. 1 so as to maintain the two belts 160 taunt in order that leaves can be efficiently conveyed between the main conveyor belt 152 and the rearmost vertical run of the belt 160.

To drive each of the lateral conveyors 150, there is provided a pulley 182 fixed to the inner end of each respective shaft 168 and a v-belt drive 181 is trained therearound and appropriately guided around the front run of the belts 160 to where the drive belt is properly trained around a drive pulley 183 that is operative to drive the conveyor assembly 150.

Therefore, in operation, as the tobacco harvester is driven through the field, the defoliator assemblies 80 cooperate with each other to defoliate a certain portion of the stalks passing therebetween. The defoliated leaves fall onto the respective conveyor assemblies 82 and are conveyed rearwardly therefrom where the leaves fall onto each of the lateral conveyors 150. From the lateral conveyors 150 leaves fall on the upper receiving run 152a of the main vertical conveyor belt 152 and are conveyed upwardly between the main conveyor belt 152 and the adjacent front cooperating belts 160 of each vertical conveyor assembly. As the leaves are conveyed upwardly between the main conveyor belt 152 and the vertical belts 160 the leaves fall onto the rear transverse conveyor 180 as best illustrated in FIG. 1. Once upon the main transverse conveyor 180 the leaves are conveyed laterally to where they fall in a trailer T being towed by the tractor 12. It should be pointed out that the leaves could be spread in the trailer as they fall by a workman stationed in the trailer with an implement such as a pitch fork or the like, or in the alternative a cable drive could be connected between the trailer and the frame structure of the tobacco harvester so as to move the trailer relative to the end of the cross conveyor 180 and to generally spread the leaves longitudinally within the trailer.

By the use of a hydraulic cylinder or other suitable means the intermediate slide frame 40 can be moved laterally back and forth on beams 32 and 34 in order that either of two adjacent rows can be harvested. This, of course, allows the farmer to skip every fifth row in order that the tractor 12 may move along the skipped row and harvest either of the two rows immediately to the right thereof.

Figure 8:
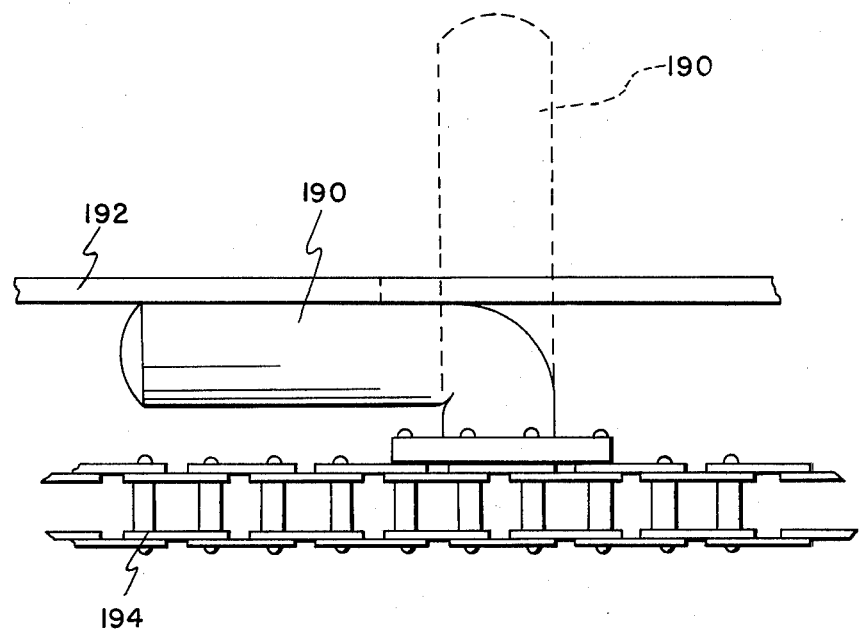
FIGS. 8 and 9 show alternate defoliator finger designs and the manner in which the respective alternate defoliator finger designs are actuated between defoliating and non-defoliating position.
Figure 9:
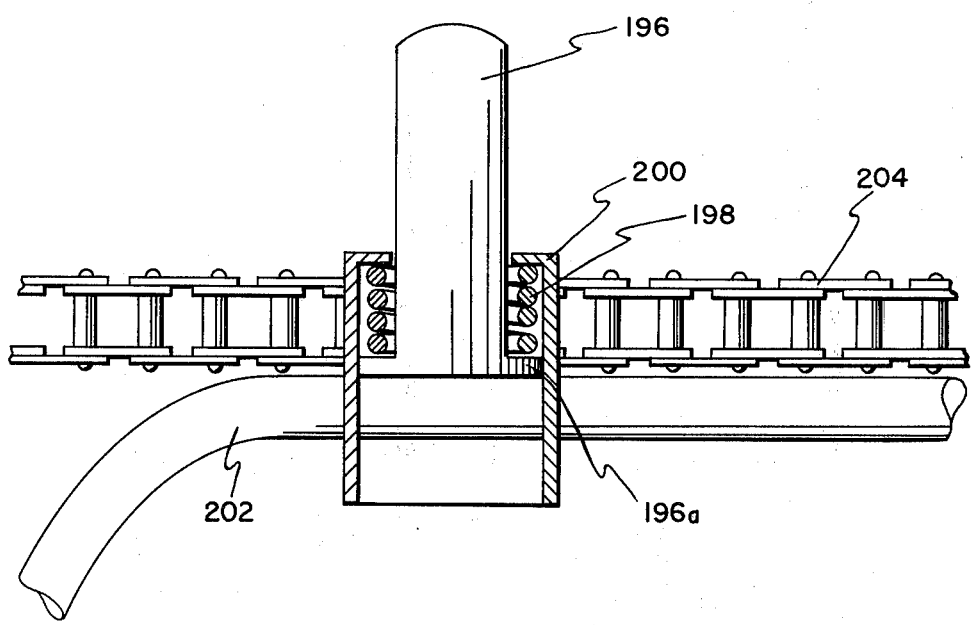

As an alternate type of defoliator finger, the present invention discloses two alternate species. The first species is shown in FIG. 8 and includes a rubber like resilient defoliator finger 190 secured to a chain 194 and projecting inwardly therefrom toward the stalk row opening between respective defoliator assemblies. There is also provided a cam track 192 inwardly spaced from the chain of a particular configuration so as to bend the rubber like resilient defoliator fingers 190 back to a non-defoliating position during the travel of the defoliator finger along the rear-to-front horizontal run in accordance with the basic defoliating and nondefoliating function as was already described in the case of the defoliator assembly shown in FIG. 3.

The second alternate design for the defoliator fingers and means for actuating the same between the defoliating and nondefoliating positions comprises a rigid defoliator finger 196 slidably mounted within a sleeve follower 200 and normally spring biased to a retracted position by a spring 198 wound around a portion of the finger between a piston like portion 196a of the finger and an inner side of the sleeve follower 200. The sleeve follower 200 is fixed to a chain 204 and includes an opening (not shown) that is disposed about a particularly shaped cam track 202. Consequently, as the chain is driven along the cam track 202, the same acts to urge the finger 196 to an outwardly extending defoliating position, while the same cam track along certain paths of the travel of the respective fingers 196 is so configured that the spring 198 urges the finger inwardly to a retracted non-defoliating position.

It will also be understood by those skilled in the art that the defoliator head shown in FIG. 3 could be utilized on a self-propelled tobacco harvester as well as with the tractor mounted design disclosed herein. In addition, the tractor mounted design disclosed herein basically uses a chain and belt drive system for driving the various components of the harvester. It should, however, be understood that the various drives shown could be hydraulically powered and could even utilize the hydraulic system of the tractor.

The terms "upper", "lower", "forward", "rearward", etc., have been used herein merely for the convenience of the foregoing specification and in the appended claims to describe the AutomaticTobacco Harvester and Defoliator Assembly Therefor and its parts as oriented in the drawings. It is to be understood, however, that these terms are in no way limiting to the invention since the Automatic Tobacco Harvester and Defoliator Assembly Therefor may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A tractor mountable automatic tobacco harvester adapted to be connected to and supported by a farm tractor, said tobacco mountable automatic tobacco harvester comprising:
 a. frame structure means adapted to operatively connect to said tractor and to extend therefrom;
 b. a pair of defoliator assemblies supported by said frame structure means in lateral spaced apart relationship so as to define a row opening area therebetween for receiving and allowing tobacco stalks of the row to pass therethrough during the harvesting operation in order that said defoliator assemblies may cooperate to defoliate leaves from respective stalks passing therebetween, each defoliator assembly comprising:
  b 1. a driven endless defoliator finger carrier means movable generally longitudinally back and forth between front and rear portions of the defoliator assembly;

b 2. a plurality of defoliator fingers operatively connected to and carried by said defoliator finger carrier means and movable relative thereto between an inwardly extended defoliating position and a retracted non-defoliating position wherein in said extended defoliating position said defoliator fingers project into the plane of the tobacco stalk row passing between said defoliator assemblies and adjacent respective stalks so as to engage certain tobacco leaves of the stalk and to defoliate the leaves therefrom as the tobacco harvester is driven along the row and wherein in said non-defoliating position said defoliator fingers being retracted from the plane of the tobacco stalk row and ineffective to defoliate leaves from the tobacco stalk passing between said defoliator assemblies;

b 3. actuating means for moving respective defoliator fingers between said defoliating and non-defoliating positions in response to the travel of said defoliator finger carrier means at predetermined times in the movement cycle thereof such that each of said defoliator finger means remains in said defoliating and non-defoliating positions during certain portions of the carrier finger means movement cycle; and c. conveyor means operatively associated with said defoliator assemblies for receiving the defoliated tobacco leaves therefrom and for conveying the defoliated leaves to a collection area that is normally operatively associated with said tobacco harvester.

2. The tractor mountable tobacco harvester of claim 1 wherein said frame structure means includes a main frame having a three point hitch assembly associated therewith and operative to directly connect to a conventional three point hitch extending from the rear of the tractor in which the harvester is to be mounted, said three point hitch assembly associated with said main frame including a base member extending between the lower two hitch points of the conventional three point tractor hitch and an upper swing frame assembly pivotably mounted about a longitudinal axis relative to said tractor to said lower base member and pivotable about said axis in response to said frame structure means moving over terraces and undulations in the field whereby said frame structure means may move independently of the tractor and follow the general contour of the ground around and in the vicinity of the tobacco stalks being harvested.

3. The tractor mountable tobacco harvester of claim 1 wherein said frame structure means further includes a wheel supported sub-frame assembly depending downwardly therefrom and having ground engaging wheel means rotatively mounted thereon, said sub-frame assembly having said defoliator assembly fixed thereto such that said defoliator assemblies are supported and carried in lateral spaced apart relationship.

4. The tractor mountable tobacco harvester of claim 3 wherein said frame structure means further includes an intermediate slide frame slidably mounted on said main frame and having said sub-frame assembly operatively connected thereto and depending downwardly therefrom whereby by sliding said intermediate frame laterally at least one inside row that normally runs adjacent the tractor can be skipped and the row outwardly thereof may be harvested.

5. The tractor mountable tobacco harvester of claim 1 wherein said endless finger carrier means of each separate defoliator assembly includes a longitudinal rear-to-front generally horizontal run, a front rearwardly and downwardly inclined run, and a back return run extending between said longitudinal and front runs; and wherein said actuating means includes means for retracting respective defoliator fingers to said non-defoliating position during a substantial portion of their movement along said longitudinal run, and for extending said defoliatig fingers to said defoliating position during a substantial portion of their movement along said front run.

6. The tractor mountable tobacco harvester of claim 5 wherein said actuating means for moving said defoliator fingers between said defoliating and non-defoliating positions includes a cam track of a given configuration associated with each defoliating assembly, and wherein each defoliating finger includes a follower associated therewith and movably engageable with said cam track such that each respective finger is moved between said defoliating positions and non-defoliating positions as said follower moves along selected portions of said cam track.

7. The tractor mountable tobacco harvester of claim 6 wherein said carrier finger means of each defoliator assembly comprises a pair of laterally spaced endless flexible members driven in unison, each endless flexible member having a plurality of sleeves circumferentially fixed thereto; and wherein each of said defoliator fingers includes an elongated finger slidably mounted within and between respective aligned sleeves, and wherein said follower is directly secured to each finger and extends therefrom for selective engagement with said cam track.

8. The tractor mountable tobacco harvester of claim 7 wherein said cam track includes two laterally spaced rod-like members generally circularly wound in corresponding fashion between said pair of endless flexible finger carrier members so as to define a space therebetween for receiving said follower associated with each respective defoliator finger.

9. A defoliating assembly for an automatic tobacco harvester comprising:
 a. frame structure means;
 b. a pair of defoliator units supported by said frame structure means in lateral spaced apart relationship so as to define a row opening area therebetween for receiving and allowing tobacco stalks of the row to pass therethrough during the tobacco harvesting operation, each defoliator unit comprising:
  b 1. an endless defoliator finger carrier assembly means including a longitudinal rear-to-front generally horizontal run, a front rearwardly and downwardly inclined run, and a back return run extending between said longitudinal and front runs;
  b 2. drive means operatively associated with said endless defoliator finger carrier assembly means for driving the same continuously during the tobacco harvesting operation;
  b 3. a plurality of defoliator fingers operatively connected to and carried by said defoliator finger carrier assembly means and movable relative thereto between an inwardly extending defoliating position and a retracted non-defoliating position wherein in said extended defoliating position said defoliator fingers project into the plane of the tobacco stalk row between said defoliator units and adjacent respective stalks so as to engage certain tobacco leaves of the stalk and to defoliate the leaves therefrom as the tobacco harvester is driven along the row, and wherein in said non-defoliating position said defoliator fingers being retracted from the plane of the tobacco stalk row and ineffective to defoliate leaves from the tobacco stalks passing between said defoliator units;

b 4. actuating means for moving respective defoliator fingers between said defoliating and non-defoliating positions in response to the cyclic movement of said defoliator finger carrier assembly means, said actuating means including means for retracting respective defoliator fingers to said non-defoliating position during a substantial portion of their movement along said longitudinal run, and for extending said defoliating fingers to said defoliating position during a substantial portion of their movement along said front run; and c. conveyor means operatively associated with said defoliator unit for receiving the defoliated leaves therefrom and for conveying the defoliated leaves to a collection area that is normally operatively associated with said defoliator assemblies.

* * * * *